(12) United States Patent
Herrington et al.

(10) Patent No.: US 12,020,102 B2
(45) Date of Patent: *Jun. 25, 2024

(54) SYSTEMS AND METHODS FOR PRODUCING NON-STANDARD SHAPED CARDS

(71) Applicant: Capital One Services, LLC, McLean, VA (US)

(72) Inventors: Daniel Herrington, New York, NY (US); Suzanne Parker, Rhoadesville, VA (US); Adrian Garner, Chesterfield, VA (US); Lin Ni Lisa Cheng, Great Neck, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,129

(22) Filed: Apr. 11, 2023

(65) Prior Publication Data

US 2023/0244897 A1    Aug. 3, 2023

Related U.S. Application Data

(63) Continuation of application No. 17/405,688, filed on Aug. 18, 2021, now Pat. No. 11,651,184, which is a continuation of application No. 16/733,964, filed on Jan. 3, 2020, now Pat. No. 11,132,594.

(51) Int. Cl.
   *G06K 19/077*    (2006.01)
(52) U.S. Cl.
   CPC ... *G06K 19/0772* (2013.01); *G06K 19/07722* (2013.01)

(58) Field of Classification Search
   CPC .................. G06K 19/0772; G06K 19/07722
   USPC ........................................................ 235/492
   See application file for complete search history.

(56) References Cited

U.S. PATENT DOCUMENTS

| | | | |
|---|---|---|---|
| 4,978,401 | A  | 12/1990 | Bonomi |
| 5,080,748 | A  | 1/1992  | Bonomi |
| 5,690,331 | A  | 11/1997 | Sides |
| 5,923,015 | A  | 7/1999  | Hill et al. |
| 6,533,325 | B1 | 3/2003  | Steidinger |
| 6,688,529 | B1 | 2/2004  | Goade, Sr. |
| 7,048,182 | B2 | 5/2006  | Zettler |
| 7,384,003 | B1 | 6/2008  | Boyer et al. |
| 7,819,310 | B2 | 10/2010 | Lasch et al. |
| 8,204,309 | B2 | 6/2012  | Cook et al. |
| 8,613,389 | B2 | 12/2013 | Payne |
| 8,973,842 | B2 | 3/2015  | Dreyer |
| 9,760,659 | B2 | 9/2017  | Eschbach et al. |

(Continued)

*Primary Examiner* — Allyson N Trail
(74) *Attorney, Agent, or Firm* — HUNTON ANDREWS KURTH LLP

(57) ABSTRACT

Example embodiments of systems and methods for card production are provided. A card may include processing circuitry including a chip and memory. The card may include one or more antennas in communication with the chip. The card may include a first layer of material aligned within a perimeter of the card via laminate encapsulation. The first layer of material may comprise a non-rectangular shape. The first layer of material may be offset with a shape of the card. The first layer of material may be in communication with the chip. The first layer of material may comprise at least one selected from the group of steel, tungsten, titanium, or any combination thereof. The card may be compliant with one or more form factors.

20 Claims, 6 Drawing Sheets

(56) References Cited

U.S. PATENT DOCUMENTS

| | | |
|---|---|---|
| 2002/0137615 A1 | 9/2002 | Shida et al. |
| 2003/0080025 A1 | 5/2003 | Fries |
| 2004/0084518 A1 | 5/2004 | Bretl et al. |
| 2004/0144472 A1 | 7/2004 | Cowie |
| 2005/0058814 A1 | 3/2005 | Crum |
| 2008/0229633 A1 | 9/2008 | Yi |
| 2010/0288833 A1 | 11/2010 | Santos et al. |
| 2014/0196403 A1 | 7/2014 | Stork et al. |
| 2016/0328479 A1 | 11/2016 | Zellner et al. |
| 2017/0109622 A1 | 4/2017 | Cepress et al. |
| 2017/0364781 A1 | 12/2017 | Mosteller |
| 2018/0018479 A1 | 1/2018 | Tang |
| 2019/0114526 A1 | 4/2019 | Finn et al. |
| 2019/0114529 A1 | 4/2019 | Ng et al. |
| 2019/0200446 A1 | 6/2019 | Long |
| 2020/0000190 A1 | 1/2020 | Graflo |
| 2020/0005114 A1 | 1/2020 | Finn et al. |
| 2020/0151534 A1 | 5/2020 | Lotya et al. |

200

SYSTEMS AND METHODS FOR PRODUCING NON-STANDARD SHAPED CARDS

CROSS-REFERENCE TO RELATED APPLICATIONS

The subject application is a continuation of U.S. patent application Ser. No. 17/405,688 filed Aug. 18, 2021, which is a continuation of U.S. patent application Ser. No. 16/733,964, filed Jan. 3, 2020, now U.S. Pat. No. 11,132,594, the complete disclosures of which are incorporated herein by reference.

FIELD OF THE INVENTION

The present disclosure relates to the production of cards, and more particularly, to systems and methods for producing non-standard shaped cards.

BACKGROUND

Many cards, such as credit cards and debit cards, are producing using a CR80 (rectangular) form factor. Accordingly, many or all high throughput machines for putting user information on the cards are set up to run rectangular shapes. When working with other shapes, these machines must be custom build or modified, which can increase costs and delay production while reducing the incentive to develop new and varied card designs.

These and other deficiencies exist. Accordingly, there is a need to provide users with an appropriate solution that overcomes these deficiencies and promotes the development of new card designs while reducing development and production costs.

SUMMARY

Aspects of the disclosed technology include systems and methods for out-of-band authenticity verification of mobile applications.

Embodiments of the present disclosure provide a card, comprising: processing circuitry including a chip and memory. The card may include one or more antennas in communication with the chip. The card may include a first layer of material aligned within a perimeter of the card via laminate encapsulation. The first layer of material may comprise a non-rectangular shape. The first layer of material may be offset with a shape of the card. The first layer of material may be in communication with the chip. The first layer of material may comprise at least one selected from the group of steel, tungsten, titanium or any combination thereof. The card may be compliant with one or more form factors.

Embodiments of the present disclosure provide a method for producing a card, comprising: producing one or more cards, the one or more cards comprising a non-rectangular shape; personalizing the one or more cards; and customizing a shape of a slug for laminate encapsulation after the personalization of the one or more cards, wherein the shape comprises a non-rectangular shape, and wherein the shape is arranged such that the slug is disposed within a boundary of the one or more cards.

Further features of the disclosed design, and the advantages offered thereby, are explained in greater detail hereinafter with reference to specific example embodiments illustrated in the accompanying drawings.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

As further described herein, systems and methods may utilize non-rectangular slugs while maintaining a form factor through the end of personalization so that they may be punched into shape at the very end and thus do not require modification to existing machinery.

Figure 1A:
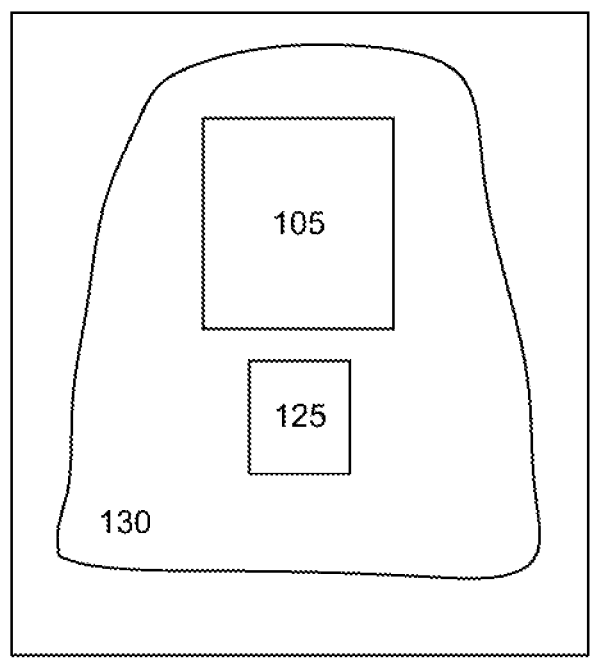
FIG. 1A is a diagram of a card according to an example embodiment.

FIG. 1A illustrates a card according to an example embodiment. As further discussed below, card 100 may include contact pad 105, one or more antennas 125, and a first layer of material 130. Although FIG. 1A illustrates single instances of the components, card 100 may include any number of components.

Figure 1B:
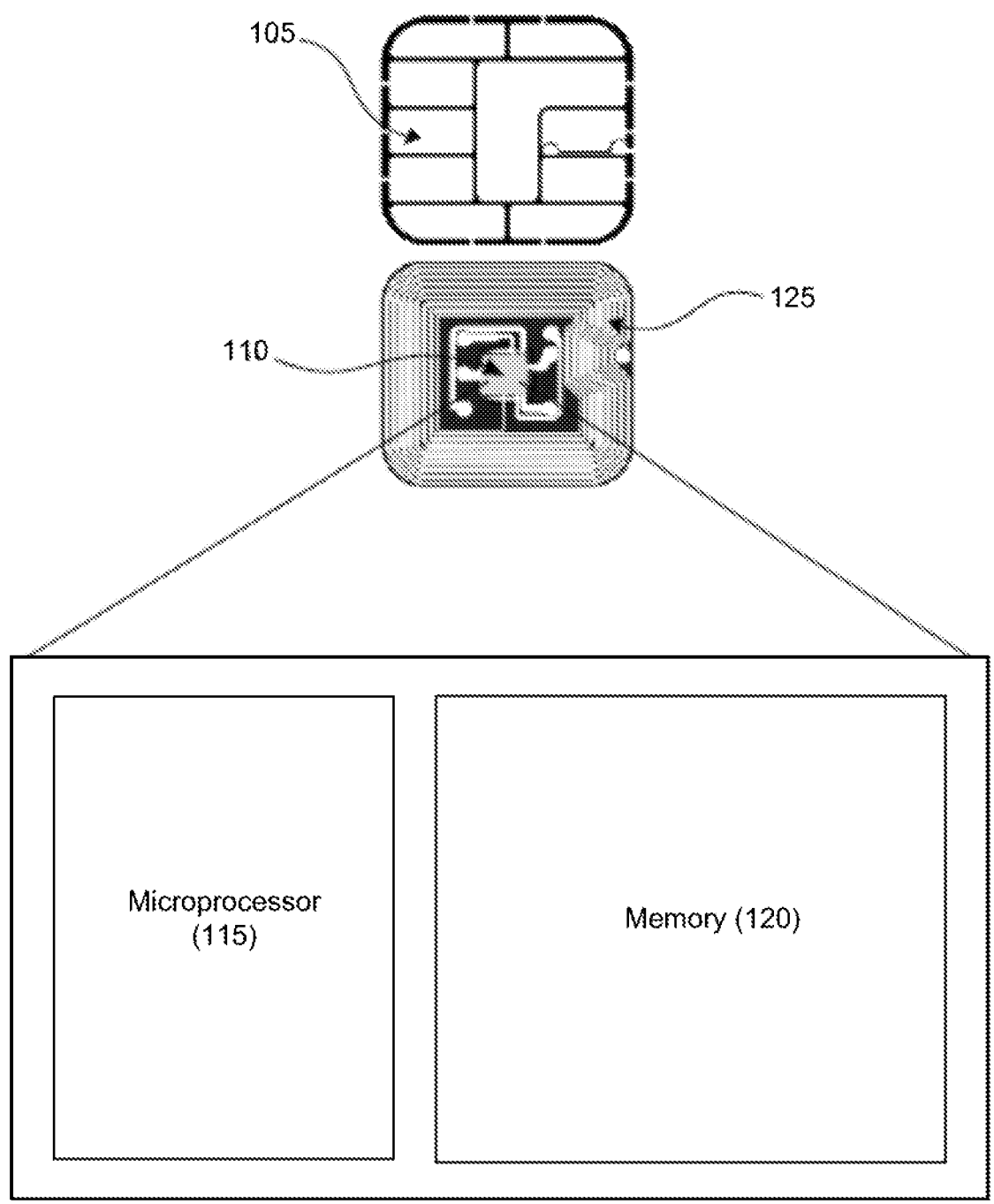
FIG. 1B is a diagram of a card according to an example embodiment.

As illustrated in FIG. 1B, the card 100 may also include a contact pad 105, which may include processing circuitry 110 for storing and processing information, including a chip or processor 115 and a memory 120. The contact pad 105 may be configured to establish contact with another communication device, such as a user device, smart phone, laptop, desktop, or tablet computer. The card 100 may also include processing circuitry, antenna and other components not shown in FIG. 1A. These components may be located behind the contact pad 105. The card 100 may also include one or more magnetic strips or tapes, which may be located on one or more surfaces of the card 100. In some examples, the one or more magnetic strips or tapes may be located on the front of the card 100 and in other examples, the one or more magnetic strips or tapes may be located on the back of the card 100.

It is understood that the processing circuitry 110 may contain additional components, including processors, memories, error and parity/CRC checkers, data encoders, anticollision algorithms, controllers, command decoders, security primitives and tamperproofing hardware, as necessary to perform the functions described herein.

The memory 120 may be a read-only memory, write-once read-multiple memory or read/write memory, e.g., RAM, ROM, and EEPROM, and the card 100 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The processor and memory elements of the foregoing exemplary embodiments are described with reference to the contact pad, but the present disclosure is not limited thereto. It is understood that these elements may be implemented outside of the contact pad 105 or entirely separate from it, or as further elements in addition to processor 115 and memory 120 elements located within the contact pad 105.

In some examples, the card 100 may comprise one or more antennas 125. The one or more antennas 125 may be placed within the card 100 and around the processing circuitry 110 of the contact pad 105. For example, the one or more antennas 125 may be integral with the processing circuitry 110 and the one or more antennas 125 may be used with an external booster coil. As another example, the one or more antennas 125 may be external to the contact pad 105 and the processing circuitry 110.

In an embodiment, the coil of card 100 may act as the secondary of an air core transformer. The terminal may communicate with the card 100 by cutting power or amplitude modulation. The card 100 may infer the data transmitted from the terminal using the gaps in the card's power connection, which may be functionally maintained through one or more capacitors. The card 100 may communicate back by switching a load on the card's coil or load modulation. Load modulation may be detected in the terminal's coil through interference.

As explained above, the card 100 may be built on a software platform operable on smart cards or other devices having limited memory, such as JavaCard, and one or more or more applications or applets may be securely executed.

Referring back to FIG. 1A, the card 100 may comprise a contactless card. By way of non-limiting examples, the card 100 may comprise at least one selected from the group of credit card, debit card, gift card, identification card, government card, and transportation card. The card 100 may be in compliance with one or more form factors, including but not limited to CR80 and CR100. It is understood that the card 100 is not limited to a contactless card, and that contact-based or other cards are included within the present disclosure. It is further understood that the present disclosure is not limited to a certain type of card, such as a payment card or an identification card, and the present disclosure includes any type of card.

The first layer of material 130 may comprise a slug. For example, the first layer of material 130 may be aligned within a perimeter of the card 100. In some examples, the first layer of material 130 may comprise a predetermined shape. In some examples, the predetermined shape may comprise one or more apertures configured to house contact pad 105. The predetermined shape may comprise any shape, including a non-rectangular shape.

The non-rectangular shape of the first layer of material 130 may comprise one or more portions, such as edges, sides, and/or corners. For example, any one of the one or more portions may be curved. By way of non-limiting examples, the non-rectangular shape may comprise a circular shape, an oval shape, an elliptical shape, a trapezoidal shape, a horseshoe shape, a bullet shape, a door knob shape, or any other shape. The first layer of material 130 may comprise at least one selected from the group of steel, tungsten, titanium, and/or any combination thereof.

The first layer of material 130 may be disposed within the card via laminate encapsulation after personalization of the card 100. In some examples, personalization of the card 100 may include encoding data, card embossing, and printing data onto a card that is specific to an account or user. Without limitation, personalization may further encompass the addition of one or more images, and/or one or more patterns, which may be based on user preference. Personalization may provide the benefit of distinguishing the card 100 from other cards and the benefit of providing additional security. In some examples, the one or more images may comprise at least one selected from the group of a picture of the user, a picture chosen by the user, a logo, and a security image. In some examples, the one or more patterns may include at least one selected from the group of a pattern chosen by the user, a computer generated pattern, and a randomly generated pattern. The first layer of material 130 may be offset with a shape of the card 100. For example, the first layer of material 130 may not be used all the way to the edge of the card 100, and thus may fall within a perimeter of the card 100. The first layer of material 130 may be in communication with the chip 115 to facilitate contact transactions and/or contactless transactions.

The first layer of material 130 may comprise a weight of about 16.3 grams. In some examples, a weight of the first layer of material 130 may exceed a weight of the plastic material contents of the card 100. In some examples, the weight of the plastic material contents of the card 100 may be less than three grams. By way of example, the first layer of material 130 may comprise a length dimension of at least three inches, and a height dimension of at least 1.5 inches.

Figure 2:
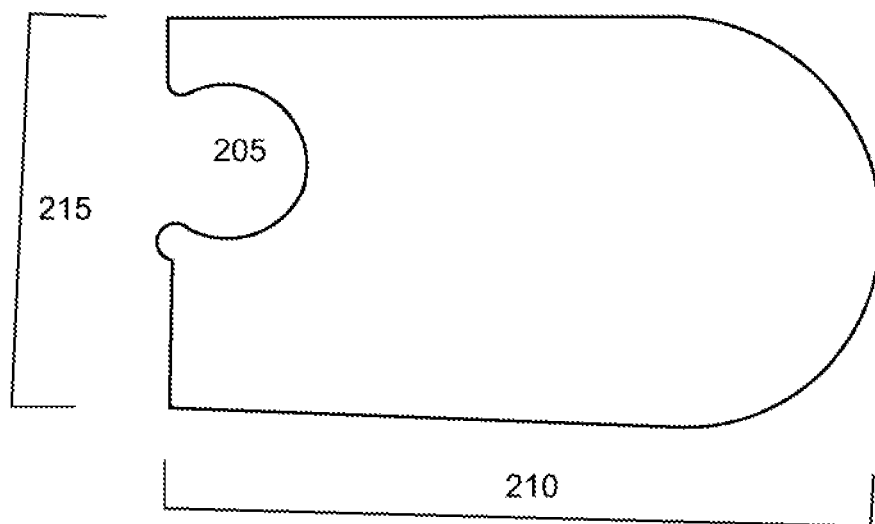
FIG. 2 is a diagram of a layer of material according to an example embodiment.

FIG. 2 is a diagram of a layer of material 200 of a card according to an example embodiment. In some examples, the layer of material 200 may be the same or similar as layer of material 130 of FIG. 1A.

The first layer of material 200 may comprise a slug. For example, the first layer of material 200 may be aligned within a perimeter of a card, similar to that of card 100. In some examples, the first layer of material 200 may comprise a predetermined shape. In some examples, the predetermined shape may comprise one or more apertures 205 configured to house a contact pad, similar to contact pad 105. The predetermined shape may comprise any shape, including a non-rectangular shape.

The non-rectangular shape of the first layer of material 200 may comprise one or more portions, such as edges, sides, and/or corners. For example, any one of the one or more portions may be curved. By way of non-limiting examples, the non-rectangular shape may comprise a circular shape, an oval shape, an elliptical shape, a trapezoidal shape, a horseshoe shape, a bullet shape, a door knob shape, or any other shape. The first layer of material 200 may comprise at least one selected from the group of steel, tungsten, tungsten, titanium, and/or any combination thereof.

The first layer of material 200 may be disposed within the card via laminate encapsulation after personalization of the card. In some examples, personalization of the card may include encoding data, card embossing, and printing data onto a card that is specific to an account or user. Without limitation, personalization may further encompass the addition of one or more images, one or more patterns, which may be based on user preference. Personalization may provide the benefit of distinguishing the card 100 from other cards and the benefit of providing additional security. In some examples, the one or more images may comprise at least one selected from the group of a picture of the user, a picture chosen by the user, a logo, and a security image. In some examples, the one or more patterns may include at least one selected from the group of a pattern chosen by the user, a computer generated pattern, and a randomly generated pattern. The first layer of material 200 may be in communication with a chip, similar to that of chip 115, to facilitate contact transactions and/or contactless transactions.

The first layer of material 200 may comprise a weight of about 16.3 grams. In some examples, a weight of the first layer of material 200 may exceed a weight of the plastic material contents of the card. By way of example, the first layer of material 200 may comprise a length dimension 210 of at least three inches, and a height dimension 215 of at least 1.5 inches.

Figure 3:
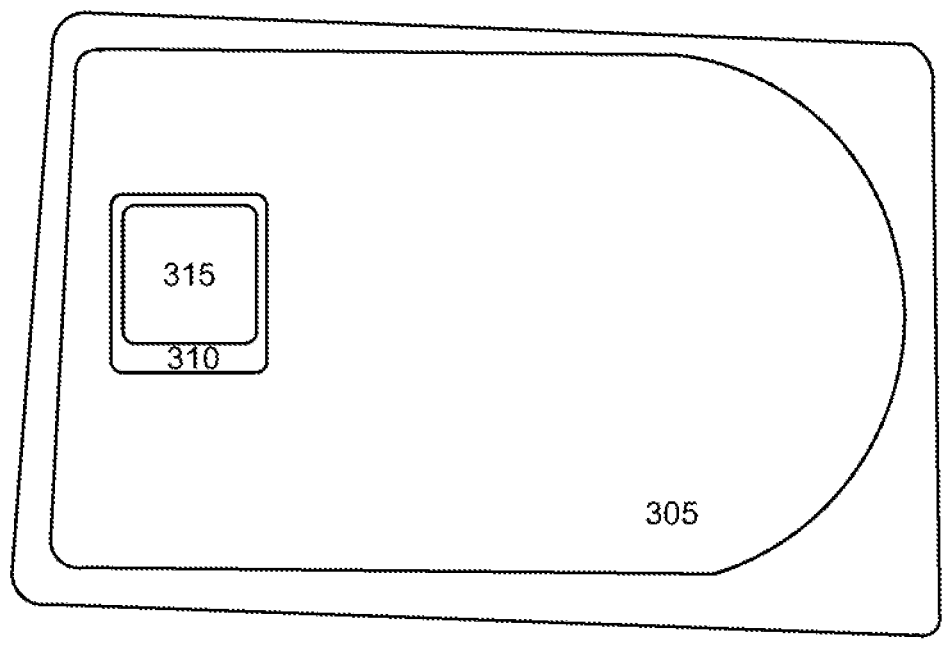
FIG. 3 is a diagram of a card according to another example embodiment.

FIG. 3 is a diagram of a card 300 according to another example embodiment. The card 300 may include a layer of material 305. In some examples, the layer of material 305 may be the same or similar as layer of material 130 of FIG. 1A and 200 of FIG. 2.

The first layer of material 305 may comprise a slug. For example, the first layer of material 305 may be aligned within a perimeter of a card 300, similar to that of card 100. In some examples, the first layer of material 305 may comprise a predetermined shape. In some examples, the predetermined shape may comprise one or more apertures 310. In some examples, aperture 310 may be configured to house contact pad or placement of chip 315. The predetermined shape may comprise any shape, including a non-rectangular shape.

The non-rectangular shape of the first layer of material 305 may comprise one or more portions, such as edges, sides, and/or corners. For example, any one of the one or more portions may be curved. By way of non-limiting examples, the non-rectangular shape may comprise a circular shape, an oval shape, an elliptical shape, a trapezoidal shape, a horseshoe shape, a bullet shape, a door knob shape, or any other shape. The first layer of material 305 may comprise at least one selected from the group of steel, tungsten, titanium, and any combination thereof.

The first layer of material 305 may be disposed within the card 300 via laminate encapsulation after personalization of the card 300. In some examples, personalization of the card 300 may include encoding data, card embossing, and printing data onto a card that is specific to an account or user. Without limitation, personalization may further encompass the addition of one or more images, one or more patterns, which may be based on user preference. Personalization may provide the benefit of distinguishing the card 100 from other cards and the benefit of providing additional security. In some examples, the one or more images may comprise at least one selected from the group of a picture of the user, a picture chosen by the user, a logo, and a security image. In some examples, the one or more patterns may include at least one selected from the group of a pattern chosen by the user, a computer generated pattern, and a randomly generated pattern. The first layer of material 305 may be offset with a shape of the card 300. For example, the first layer of material 305 may not be used all the way to the edge of the card 300, and thus may fall within a perimeter of the card 300. The first layer of material 305 may be in communication with a chip 315 disposed in aperture 310, similar to that of chip 115, to facilitate contact transactions and/or contactless transactions.

The first layer of material 305 may comprise a weight of about 16.3 grams. In some examples, a weight of the first layer of material 305 may exceed a weight of the plastic material contents of the card 300. In some examples, the weight of the plastic material contents of the card 300 may be less than three grams.

Figure 4:
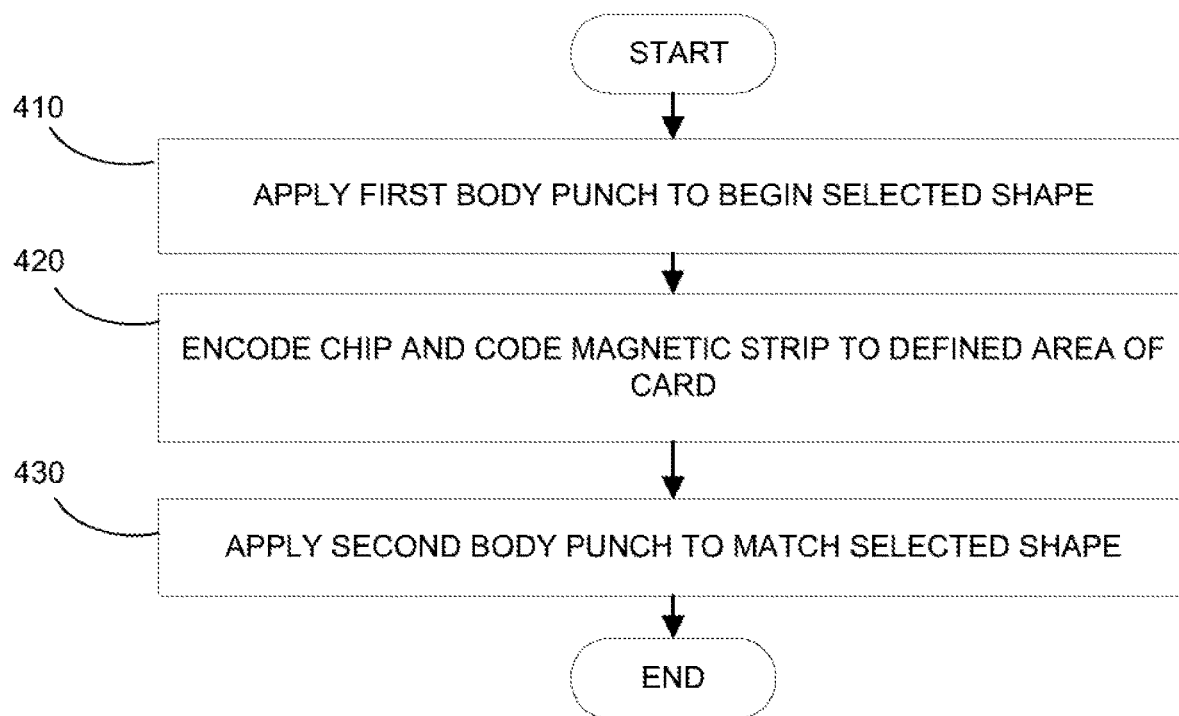
FIG. 4 is a method illustrating a sequence for producing a card according to an example embodiment.

FIG. 4 illustrates a method 400 for producing a card according to an example embodiment. The card may reference same or similar components as card 100 of FIG. 1A, FIG. 1B, FIG. 2, and FIG. 3 as described above.

At block 410, the method may include a first body punching step. The first body punching may include yield a partially finished card to begin a selected shape. As explained above, the selected shape may comprise a non-standard shape or the predetermined shape. In some examples, the first body punching may return a card that includes a plurality of dimensions exceeding that of CR80. For example, the plurality of dimensions may comprise a width dimension and a length dimension. Thus, the card may include a width and a length that are both greater than that of CR80, thereby distinguishing from CR80. In addition, the card may be comprise the same thickness to that of CR80. In some examples, the first body punching may be performed after a first set of processes. For example, the first set of processes may include but not be limited to plate making and sheet printing, sheet collation, lamination, sheet striping, hot stamping, and chip module milling and implanting, and any combination thereof. It is understood that the first body punching may occur after any one or combination of the first set of processes.

At block 420, the method may include a chip and coding step. For example, coding may be used on a magnetic strip of the card. In some examples, a defined compressed code area may be used, such that a coding within a defined area of the card associated with the shape is used. The chip and magnetic strip coding may be performed after the first body punching and prior to the second body punching.

At block 430, the method may include a second body punching step. The second body punching step may yield a smaller size card than that of CR80, and also include the same thickness of CR80. The second body punching may be paired with one or more punching modules and match the selected shape. The selected shape may comprise a non-standard shape or the predetermined shape, as previously described above. In some examples, the non-standard shape or the predetermined shape may be programmed as part of a card selection process when a user applies for the card. Moreover, the card may include an antenna configured for the non-standard shape or the predetermined shape of the second body punching step. In some examples, the second body punching may be performed prior to a pairing process in which the card may be brought to the one or more punching modules for the finished shape personalization. In some examples, the second body punching may be performed after a second set of processes. In some examples, the second set of processes may include one or more of the first body punching, chip and magnetic strip coding, and marking by laser engraving. It is understood that the second body punching may occur after any one or combination of the second set of processes.

Figure 5:
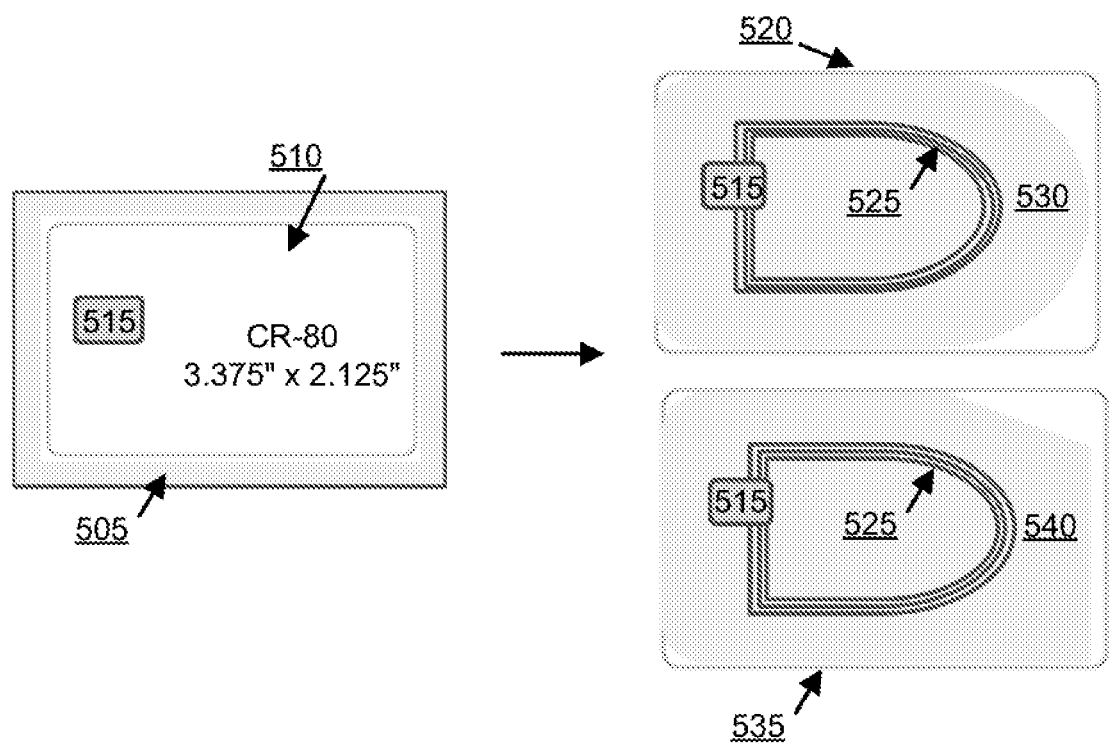
FIG. 5 is a diagram of a card subject to body punching according to an example embodiment.

FIG. 5 is a diagram 500 of a card subject to body punching according to an example embodiment. FIG. 5 may reference same or similar components as card 100 of FIG. 1A, FIG. 1B, FIG. 2, FIG. 3, and FIG. 4, as described above.

Card 505 may include a chip 515. In some examples, card 505 may be same or similar to card 100. Chip 515 may be same or similar to chip 115. Card 505 may be subject to application of a first body punching step. The first body punching may include yield a partially finished card to begin a selected shape. As explained above, the selected shape may comprise a non-standard shape or the predetermined shape. In some examples, the first body punching may return a card that includes a plurality of dimensions exceeding that of a form factor 510, such as CR80. For example, the plurality of dimensions may comprise a width dimension and a length dimension. Thus, the card may include a width and a length that are both greater than that of CR80, thereby distinguishing from CR80. In addition, the card 505 may be comprise the same thickness to that of CR80. In some examples, the first body punching may be performed after a first set of processes. For example, the first set of processes may include but not be limited to plate making and sheet printing, sheet collation, lamination, sheet striping, hot stamping, and chip module milling and implanting, and any combination thereof. It is understood that the first body punching may occur after any one or combination of the first set of processes.

In some examples, coding may be used on a magnetic strip of the card 505. In some examples, a defined compressed code area may be used, such that a coding within a defined area of the card 505 associated with the shape is used. The chip and magnetic strip coding may be performed after the first body punching and prior a second body punching.

The second body punching step may yield a smaller size card, such as card 520 or card 535, than that of form factor 510, and also include the same thickness of form factor 510. The second body punching may be paired with one or more punching modules and match the selected shape. The selected shape may comprise a non-standard shape or the predetermined shape 530, 540, as previously described above. In some examples, the non-standard shape or the predetermined shape 530, 540 may be programmed as part of a card selection process when a user applies for the card 505. In one example, card 520 may include shape 530 which may comprise a non-rectangular shape, such as horseshoe shape or a bullet shape or the like, similar to slug 130. In another example, card 535 may include shape 540 which may comprise another non-rectangular shape of slug, similar to slug 130. In either example, shape 530, 540 may comprise one or more rounded corners and/or one or more non-rounded corners, or any combination thereof. In addition, it is understood that any other shapes may be used.

Moreover, the card 505 may include an antenna 525 configured for the non-standard shape or the predetermined shape 530, 540 of the second body punching step. In some examples, the second body punching may be performed prior to a pairing process in which the card 505 may be brought to the one or more punching modules for the finished shape personalization. In some examples, the second body punching may be performed after a second set of processes. In some examples, the second set of processes may include one or more of the first body punching, chip and magnetic strip coding, and marking by laser engraving. It is understood that the second body punching may occur after any one or combination of the second set of processes.

The present disclosure includes one or more shaped cards, including but not limited to square, elliptical, non-rectangular, rectangular, triangular, or any other shaped cards. In some examples, the card may comprise a contactless card or a contact-based card. By way of non-limiting examples, the card may be at least one selected from the group of credit card, debit card, gift card, identification card, government card, loyalty program card, and transportation card. In some examples, the card may be compliant with one or more form factors, including but not limited to CR80 and CR100, however, it is understood that non-compliant cards are within the scope of the present disclosure.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for producing a card, comprising:
applying a first body punch to the card so as to begin a predetermined shape; and
applying a second body punch to the card so as to align an antenna with the predetermined shape,
wherein one or more dimensions of the card exceed one or more dimensions of a form factor, and
wherein a size of the card is smaller than a size associated with the form factor.

2. The method of claim 1, wherein the form factor comprises at least one selected from the group of CR80 and CR100.

3. The method of claim 1, further comprising:
prior to applying the first body punch, performing one or more processes to the card,
wherein the one or more processes comprise at least one selected from the group of plate making, sheet printing, sheet collation, and lamination.

4. The method of claim 1, wherein:
the card includes a magnetic strip, and
the method further comprises, prior to applying the second body punch, coding a magnetic strip.

5. The method of claim 1, further comprising, prior to applying the second body punch, marking the card by laser engraving.

6. The method of claim 1, wherein the second body punch applies a punch module comprising the predetermined shape.

7. The method of claim 1, wherein the predetermined shape comprises one or more apertures.

8. The method of claim 7, wherein the one or more apertures are configured to house a contact pad.

9. The method of claim 1, wherein the one or more apertures are configured to house a chip.

10. The method of claim 1, wherein the predetermined shape comprises a non-rectangular shape.

11. The method of claim 10, wherein the non-rectangular shape comprises a circular shape, an oval shape, an elliptical shape, a trapezoidal shape, a horseshoe shape, a bullet shape, or a door knob shape.

12. A card, comprising:
a first shape, wherein:
the first shape comprises a first layer of material, and
the first shape comprises a non-rectangular shape; and
a second shape comprising a perimeter of the card,
wherein one or more dimensions of the card exceed one or more dimensions of a form factor, and
wherein a size of the card is smaller than a size associated with the form factor.

13. The card of claim 12, wherein the first shape is offset from the second shape.

14. The card of claim 12, wherein the form factor comprises at least one selected from the group of CR80 and CR100.

15. The card of claim 12, wherein:
the first shape includes an aperture, and
the card further comprises a chip housed within the aperture.

16. The card of claim 15, wherein:
the antenna is in communication with the chip, and
the antenna is configured for the first shape.

17. The card of claim 12, wherein the card is at least one selected from the group of a credit card, a debit card, a gift card, an identification card, a government card, a loyalty program card, and a transportation card.

18. A method for producing a card, comprising:
providing a slug;
applying a first body punch to the slug so as to begin a predetermined shape; and
applying a second body punch to the slug so as to align an antenna with the predetermined shape,
wherein one or more dimensions of the card exceed one or more dimensions of a form factor, and
wherein a size of the card is smaller than a size associated with the form factor.

19. The method of claim 18, wherein the predetermined shape comprises a non-rectangular shape.

20. The method of claim 18, further comprising:
prior to applying the first body punch, performing one or more processes to the slug,
wherein the one or more processes comprise at least one selected from the group of sheet striping, hot stamping, chip module milling, and chip module implanting.

* * * * *